United States Patent [19]

Thrandorf et al.

[11] Patent Number: 4,466,529
[45] Date of Patent: Aug. 21, 1984

[54] SEPARATION UNIT FOR PROCESSED BOOK BLOCKS

[75] Inventors: Hans-Peter Thrandorf, Grossdalzig; Achim Kratzsch, Leipzig, both of German Democratic Rep.

[73] Assignee: VEB Kombinat Polygraph "Werner Lamberz", Leipzig, German Democratic Rep.

[21] Appl. No.: 335,388

[22] Filed: Dec. 29, 1981

Related U.S. Application Data

[63] Continuation-in-part of Ser. No. 74,996, Sep. 13, 1979, abandoned, which is a continuation-in-part of Ser. No. 70,049, Aug. 27, 1979, abandoned.

[30] Foreign Application Priority Data

Aug. 29, 1978 [DD] German Democratic Rep. ... 207511

[51] Int. Cl.³ ............................................. B65G 47/10
[52] U.S. Cl. ..................................... 198/368; 198/451
[58] Field of Search ............... 198/460, 461, 444, 578, 198/357, 368, 448, 451

[56] References Cited

U.S. PATENT DOCUMENTS

| | | | |
|---|---|---|---|
| 2,959,269 | 11/1960 | Kammerer | 198/578 |
| 2,978,092 | 4/1961 | Phillips et al. | 198/444 |
| 3,144,119 | 8/1964 | Nigrelli et al. | 198/451 |
| 3,273,691 | 9/1966 | Griner | 198/461 |
| 3,587,674 | 6/1971 | Adkin | 198/461 |
| 3,774,748 | 11/1973 | Dederer et al. | 198/451 |
| 3,830,358 | 8/1974 | Desantis | 198/578 |

Primary Examiner—Leslie J. Paperner
Assistant Examiner—Jonathan D. Holmes
Attorney, Agent, or Firm—Michael J. Striker

[57] ABSTRACT

A separating unit for book blocks processed in a book binding system and fed at a first travelling speed from a folding or glueing machine in two parallel horizontal stacks in which the blocks are fed one-by-one in an upright position on a first conveying means, comprises second conveying means cooperating with the latter and travelling at a higher speed, a stack support bridging the transfer area between the first and second conveying means and guiding the randomly separated book blocks on the second conveying means. In order to uniformly space apart the separated book blocks, a timing switch is provided at the end portion of the second conveying means and is controlled by two light barriers which during the passage of the leading book blocks arrest the successive book blocks and release the same upon the passage of the leading block past the first light barrier. The uniformly spaced book blocks are fed either to a single discharge conveyor or by means of a pair of swingable conveying belts to separate discharge conveying belts to feed two different processing machines.

6 Claims, 11 Drawing Figures

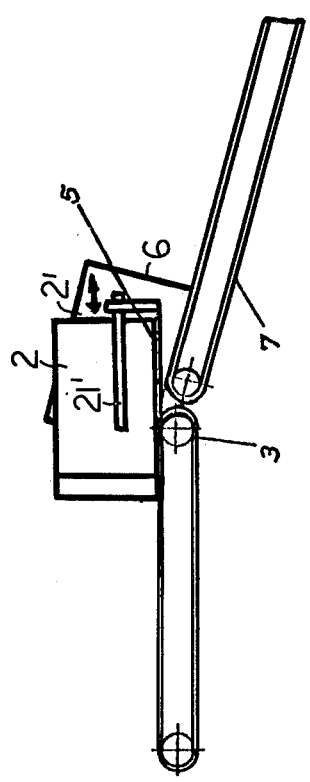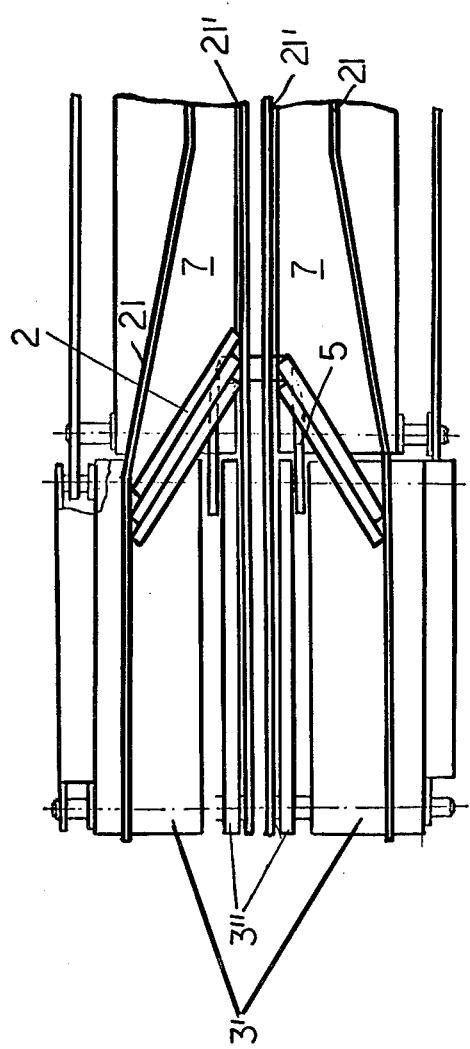

SEPARATION UNIT FOR PROCESSED BOOK BLOCKS

CROSS-REFERENCE TO RELATED APPLICATION

This application is a continuation-in-part application of my copending application Ser. No. 074,996 filed Sept. 13, 1979, now abandoned, which in turn is a continuation-in-part of my application Ser. No. 070,049 filed Aug. 27, 1979, now abandoned.

BACKGROUND OF THE INVENTION

This invention relates generally to book binding, and more particularly it relates to a separation device for the processed book blocks arranged one-by-one in an upright position in two horizontal stacks travelling side-by-side on a first conveying means at a first speed in order to undergo a processing cycle such as, for example, drying and thereupon are separated for being subject to another processing step.

From the German publication DWP No. 126 480 a conveying device for book blocks is known having a feeding track for the blocks, having two partial tracks for horizontal rows or stacks of the blocks arranged side-by-side to be manually removed at the end of each stacking track.

This known device has the disadvantage that the automatic flow of book blocks from the folding and glueing machine is interrupted and a manual charging process has to be employed for the intermediate stacking of the book blocks between the folding and glueing machine and the subsequent processing machine in the book binding system. As a result, a number of workers have consequently been employed for the intermediate stacking operation.

SUMMARY OF THE INVENTION

It is, therefore, a general object of the present invention to overcome the aforementioned disadvantages.

More particularly, it is an object of the invention to provide an improved feeding arrangement in a book binding system in which the source of disturbances in the flow of processed book blocks is removed and the laborious manual operation is avoided.

An additional object of the invention is to provide an improved separating unit for the processed book blocks which automatically separates the book blocks travelling one-by-one in two parallel horizontal stacks in an upright position and which delivers the separated books in regular working cycles for a further processing in the subsequent processing stations or machines.

In keeping with these objects, and others which will become apparent hereafter, one feature of the invention resides, in a feeding arrangement of book blocks arranged one-by-one in an upright position in two horizontal stacks travelling side-by-side on a first conveying means at a first speed to undergo, for example, a drying process, in a combination which comprises a separating device which automatically separates the book blocks from the travelling horizontal stacks and delivers separated book blocks in uniform time intervals one after the other in an upright position to subsequent conveying means. For this purpose the separating device includes second conveying means cooperating with the first conveying means at a transfer point and travelling at a higher speed corresponding to that of the discharge from the folding and glueing machine and to the drying process. At the transfer point between the first and second conveying means there are arranged stack supports, the end portions of which overlap the faster running second conveying means. The leading edges of the upright or standing book blocks on the first conveying means impinge on the stack supports and are guided thereby to land with a front edge on the faster second conveying means and are thus immediately separated from the slower stack. The stack supports are adjustable according to the size of the book blocks. At the end of the second conveying means a timing switch operates, the function of which is to control the advance of the separated book blocks at such time intervals as it is necessary for their further processing in the subsequent machines. For this purpose the timing switch or gate cooperates with a light barrier which is arranged in the range of the second conveying means across the path of travel of the book blocks. In this manner the incoming book block interrupts the light barrier and the resulting output pulse activates the timing switch and the latter arrests the feeding of the subsequent book block toward the light barrier. The leading book block in the meantime moves past another light barrier, the distance of which relative to the first light barrier is adjusted according to the desired working cycle. As soon as the trailing edge of the leading book block passes the second light barrier, the generated output impulse removes the blocking function of the timing switch and the subsequent book block can travel past the first light barrier. In this manner, a uniform working cycle is insured during which the separated book blocks are delivered to horizontally swinging conveying belts in regular and accurately predetermined intervals. The horizontally swingable conveying belts travel with the same increased speed as that of the second conveying means. From the swingable conveying belts it is possible to transfer the book blocks to a discharge conveyor at regular time intervals. The discharge conveyor forwards the uniformly separated book blocks to a subsequent machine for a further processing. In a modification it is possible to swing between two spaced discharge conveyors so that one discharge conveyor can always be supplied from one swingable conveying belt to deliver at regular intervals the separated book blocks to a subsequent processing machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1a is a side view of the separating area in the unit of FIG. 1;

FIG. 2a is a top view of the book separating area of FIG. 1a;

DESCRIPTION OF THE PREFERRED EMBODIMENTS

Figure 1:
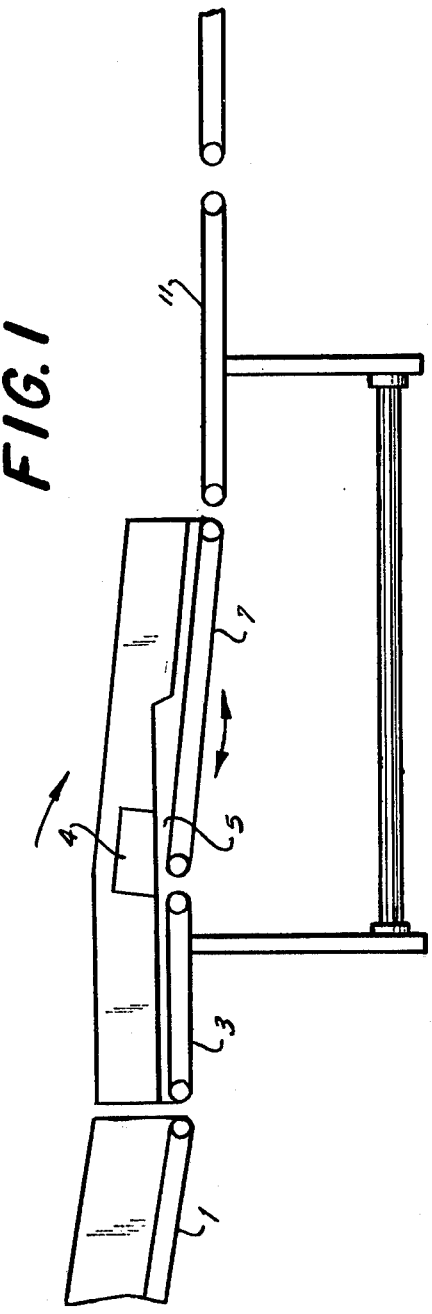
FIG. 1 is a side view of a separating unit in the feeding arrangement for book blocks.
Figure 2:
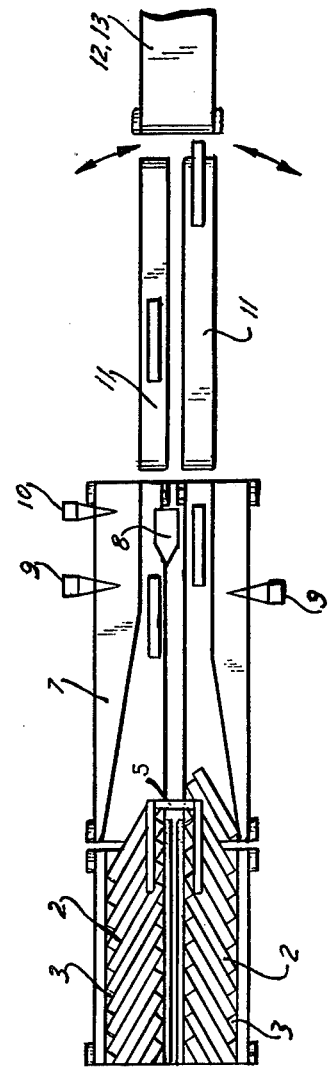
FIG. 2 is a top view of the separating unit of FIG. 1, showing two horizontal stacks of book blocks to be separated.
Figure 1B:
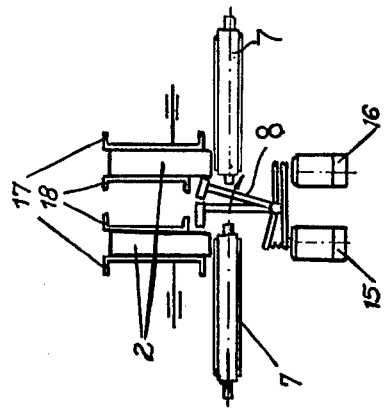
FIG. 1b is a side view of the second conveyor belts in the unit of FIG. 1 showing the location of a control switch.
Figure 2B:
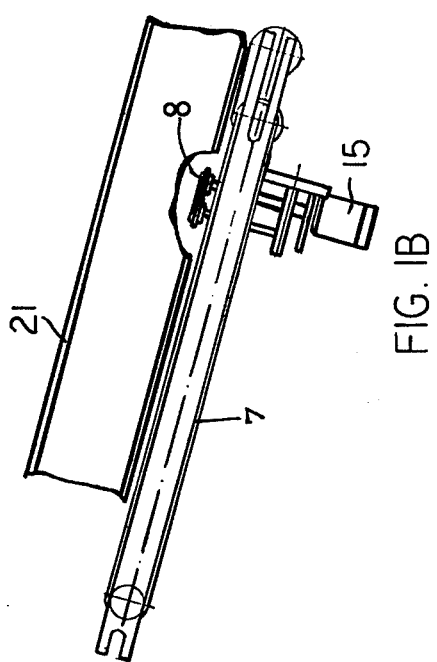
FIG. 2b is a top view of the second conveyor belts of FIG. 1b.
Figure 2C:
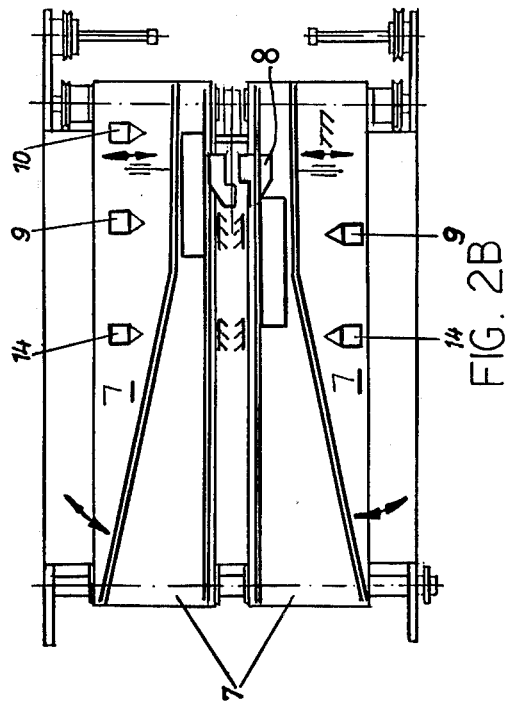
FIG. 2c is a front view of the second conveyor belts of FIG. 1b.

Referring firstly to FIGS. 1, 1a, 1b, 2, 2a, 2b and 2c, the processed book blocks are discharged from an outlet conveyor 1 of a folding and glueing machine at a first speed of travel to the first conveying belt 3 in two horizontal stacks travelling side-by-side. The book blocks in each track are arranged one-by-one in an upright position and are inclined to the direction of travel. The drive of the first conveyor belt 3 is derived from the drive of the discharge conveyor 1 and consequently the book blocks 2 travel at the same speed at which they are discharged from the machine or at which they are subject to the drying process.

The two parallel horizontal stacks of imbricated upright book blocks 2 on the first conveyor belt 3 travel to the separating area 4 at which stack supports 5 bridge the transfer point between the first conveyor belts 3 and the second conveyor belts 7, the latter forming part of the separating unit and travelling at a higher speed than that of the conveying belt 3. The first conveying belt 3, as seen from FIG. 2a, consists of outer conveyor belts 3' and inner conveyor belts 3'' driven by common rollers. The path of movement of the book blocks 2 is delimited by outer guides 21 and inner guides 21'. The inner guides 21' extend between the inner conveyor belts 3'' whereas the outer guides 21 in the range of first conveyor 3 extend parallel to the inner guides 21' but converge to the latter in the range of the second conveyor 7. The stack supports 5 consist of two bars arranged respectively between the inner conveyor belts 3'' and the outer conveyor belts 3' and project above the corresponding second conveyor belts 7. In the range of the first conveyor belt 3, the bars 5 are mounted slightly below the level of the first conveyor belt 3 and are connected to the inner guides 21'.

Figure 3:
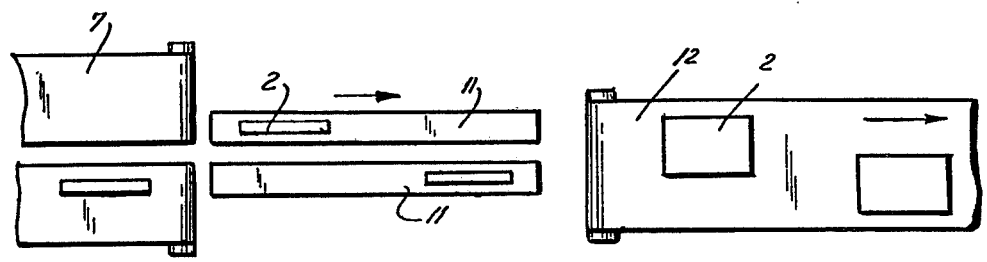
FIG. 3 shows a top view of the discharge end of the separating unit with book blocks separated in regular intervals to be discharged for a further processing.
Figure 4:
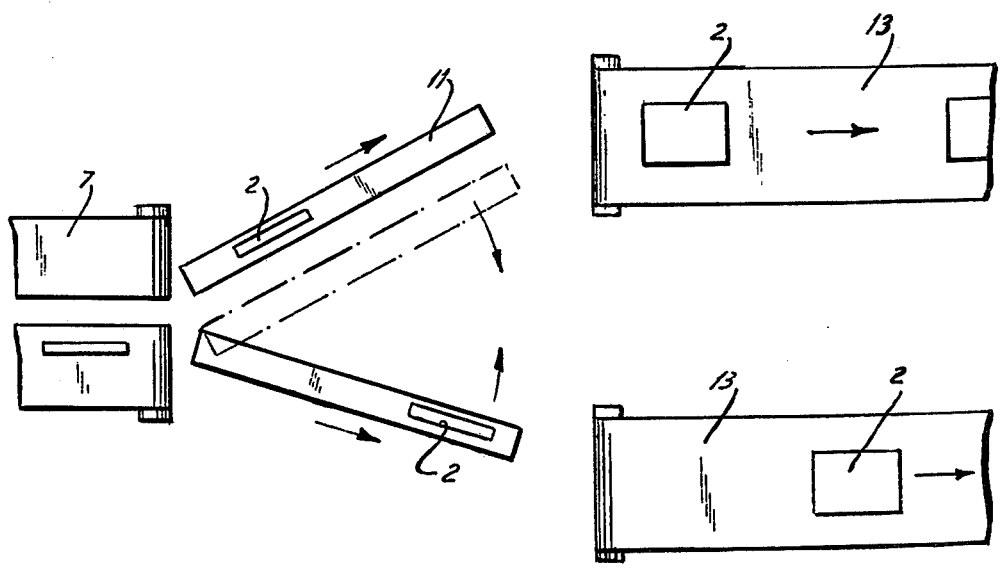
FIG. 4 is a top view of a modification of the discharge end of the separating unit of the present invention.

According to the format of the book blocks 2, the length of the part of supporting bars 5 overlapping the second conveyor belt 7 is adjusted such that the leading edge 6 of each book block leaves the support 5 while the rear edge of the book block is still on the conveyor belts 3. The relatively slowly moving conveyor belts 3 continuously displace the book blocks from the bars 5 so that the blocks fall by their own weight on the faster moving second conveying belts 7. In this manner, the book blocks are separated at irregular intervals in the direction of travel of the belts 7. The speed of travel of the second conveying belt 7 is continuously adjustable as required for the processed format length of the book blocks 2 and the working cycle of the folding and glueing machine. Also the stack supports 5 are adjustable according to the length of the book blocks 2. The separation of the book blocks by means of the faster travelling conveyors 7 and the stack supports 5 takes place without any timing and consequently the succession of the separated book blocks travelling in an upright position on the faster conveying means 7 has random intervals. In order to make these intervals uniform, a timing gate or control switch 8 including two light barriers 9 and 14, is arranged at the end portion of the second conveying device 7. The switch 8, by changing the distance between the barriers 9 and 10, is so adjustable that the book blocks 2 are released in a predetermined ratio of their length to their clearance. The leading edge 6 of an advancing book block 2 enters a first light barrier 14 and the interrupted light beam activates the switch 8 which temporarily interrupts the travel of the subsequent book block. The first book block 2 continues moving past the first light barrier 14 and as soon as its trailing edge reaches the second light barrier 9, the resulting output impulse reactivates via an electrical circuit the switch 8, and the latter releases the subsequent book block in an accurately defined spatial interval and in this manner the succession of accurately spaced book blocks 2 is delivered to horizontally swingable conveying belts 11 at the discharge end of the separating unit and therefrom the blocks are transferred to feeding conveyors 12 for processing in a subsequent machine. The swingable belts 11 can operate in unison to deliver the blocks to a single conveyor 12 (FIG. 3) or as illustrated in FIG. 4, they can supply two separate feeding conveyors 13. Each of these feeding conveyors 12 or 13 advances the book blocks to a subsequent machine for further processing. The single feeding conveyor 12 feeds the subsequent processing machine at shorter time intervals whereas the modification according to FIG. 4 provides for feeding of two processing machines at longer time intervals.

Figure 6:
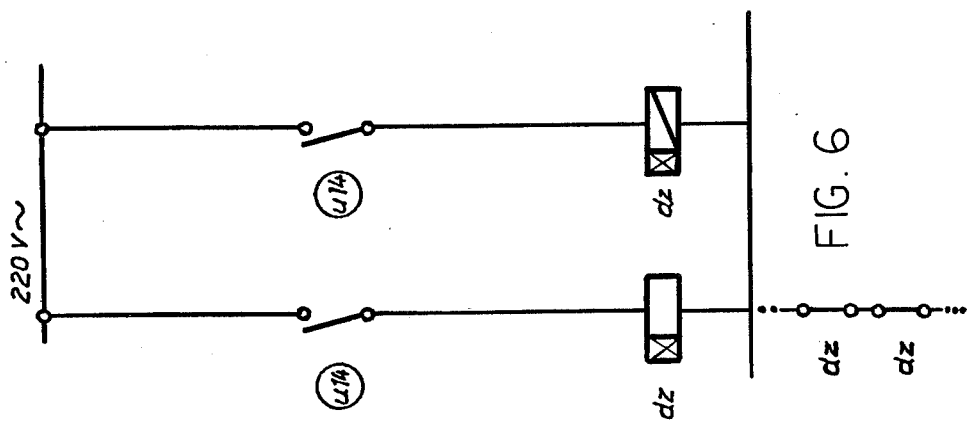
FIGS. 5 and 6 are circuit diagrams of electrical switches for activating the control switch in FIG. 1b.
Figure 5:
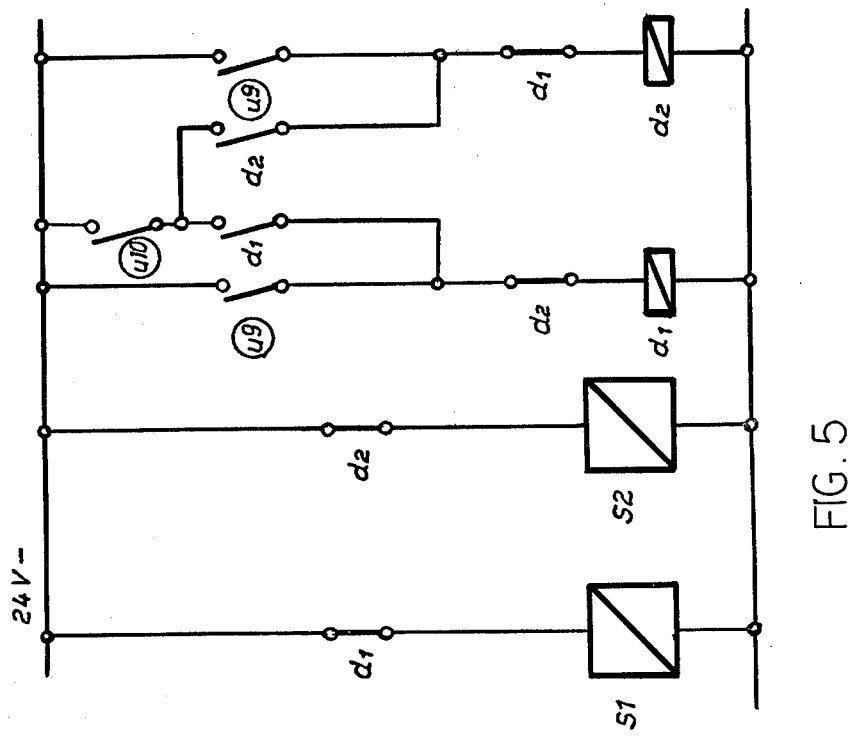

The electrical switching circuit for activating the gating switch 8 in response to the signals from the light barriers 14 and 9 is shown schematically in FIGS. 5 and 6. The two light barriers 14 and 9 determine which book block 2 from the two parallel streams is leaving. In order to equalize the intervals between the book blocks in the respective streams, the first interrupted light barrier of the pair of light barriers 14 closes an assigned electric contact U 14 and the corresponding subsequent light barrier 9 upon its interruption closes a set of corresponding electrical contacts $D_1$ or $D_2$ which determine which of the two solenoids S1 or S2, corresponding to driving members 15 and 16 in FIG. 2c, activates the gating lever of the control switch 8. The gating lever 8 momentarily blocks the detected, more advanced book block 2. The blocking is released at the moment when the rear edge of the book block in the other stream has passed the third light barrier 10. Due to the fact that the book block 2 when retained by the arm of switch 8 interrupts the light barrier 9, the latter emits a signal which causes the switch 8 to return into its neutral position. The two light barriers 14 serve for controlling an exact order in the delivery of the book blocks. In the case of an accidental jam, when a disturbance occurs in the flow of the book blocks, one of the two light barriers 24 is permanently interrupted, controlled by this light barrier 14 is therefore disconnected due to the missing intervals and thus the entire feeding unit.

It will be understood that each of the elements described above, or two or more together, may also find a useful application in other types of constructions differing from the types described above.

While the invention has been illustrated and described as embodied in a separating unit for use with a feeding arrangement for book blocks processed in a book binding system, it is not intended to be limited to the details shown, since various modifications and structural changes may be made without departing in any way from the spirit of the present invention. For instance, the book blocks travelling on the horizontally swingable conveying belts 11 can be turned over from their upright position by a non-illustrated device into a horizontal position on the feeding conveyors 12 or 13.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a feeding arrangement for book blocks discharged one-by-one in an upright position on a first conveying means travelling at a first speed so as to form two parallel horizontal book stacks on the first conveying means, a combination comprising a separating device including a second conveying means travelling at a higher speed than that of said first conveying means, and two stationary stack supports bridging said first and second conveying means in the path of movement of respective stacks to hold leading parts of the stacks while the second conveying means due to its higher speed separates individual book blocks from each stack and advances the separated book blocks in two parallel series; a gating switch arranged between the two series of book blocks to stop temporarily the advance of a book block in one series while releasing book blocks in the other series, and vice versa; and position sensors arranged for detecting relative positions of the book blocks in respective series, said sensors cooperating with said gating switch to release, in response to the detection of the leading edge, a leading book block in the other series while stopping the leading book block in the one series and subsequently releasing the latter book block in response to the detection of the trailing edge of the leading book block in said other series, so that the released book blocks in each of said series advance at accurately timed spatial intervals.

2. The combination as defined in claim 1, wherein said separating device includes horizontally swingable conveying belts travelling at the same speed as said second speed to receive the uniformly separated book blocks from said second conveying means.

3. The combination as defined in claim 1, wherein said stack supports overlap said second conveying means.

4. The combination as defined in claim 1, wherein each sensor includes two light barriers spaced apart from one another according to the required length of the interval between successive book blocks.

5. The combination as defined in claim 2, wherein said second conveying means includes two parallel conveying belts and said swingable conveying belts operating in unison with said second conveying means to transfer uniformly spaced book blocks from said second conveying means for further processing.

6. The combination as defined in claim 5, wherein a pair of said swingable conveying belts cooperate with a corresponding pair of discharge conveying belts to supply two rows of uniformly spaced book blocks to different processing machines.

* * * * *